(12) United States Patent
Ryu et al.

(10) Patent No.: US 11,422,737 B2
(45) Date of Patent: Aug. 23, 2022

(54) DATA STORAGE SYSTEM FOR DATA DISTRIBUTION AND DATA RESTORATION BASED ON COMPRESSIBILITY RATIO OF DATA AND OPERATING METHOD OF CONTROLLER FOR CONTROLLING THE DATA DISTRIBUTION AND DATA RESTORATION

(71) Applicant: SK hynix Inc., Icheon (KR)

(72) Inventors: Jun Hee Ryu, Icheon (KR); Kwang Jin Ko, Icheon (KR); Hyung Jin Lim, Icheon (KR)

(73) Assignee: SK hynix Inc., Icheon (KR)

( * ) Notice: Subject to any disclaimer, the term of this patent is extended or adjusted under 35 U.S.C. 154(b) by 16 days.

(21) Appl. No.: 17/024,540

(22) Filed: Sep. 17, 2020

(65) Prior Publication Data

US 2021/0311656 A1    Oct. 7, 2021

(30) Foreign Application Priority Data

Apr. 6, 2020  (KR) .................... 10-2020-0041759

(51) Int. Cl.
*G06F 3/06*    (2006.01)
*G06F 16/174*    (2019.01)

(52) U.S. Cl.
CPC .......... *G06F 3/0655* (2013.01); *G06F 3/0604* (2013.01); *G06F 3/065* (2013.01); *G06F 3/067* (2013.01); *G06F 16/1744* (2019.01)

(58) Field of Classification Search
CPC ...... G06F 3/0655; G06F 3/0604; G06F 3/065; G06F 3/067; G06F 16/1744
USPC .......................................... 711/161; 707/693
See application file for complete search history.

(56) References Cited

U.S. PATENT DOCUMENTS

| | | | |
|---|---|---|---|
| 2015/0149739 A1* | 5/2015 | Seo ................. | G06F 3/0685 711/162 |
| 2017/0153814 A1* | 6/2017 | Ryu ................. | G11C 11/005 |
| 2018/0300063 A1* | 10/2018 | Kang ............... | G06F 3/0659 |

FOREIGN PATENT DOCUMENTS

| KR | 1020090039146 | 4/2009 |
|---|---|---|
| KR | 101468336 | 12/2014 |

\* cited by examiner

*Primary Examiner* — Than Nguyen (57) ABSTRACT

A method for operating a controller configured to control subsystems in a network, each subsystem including a plurality of memory regions, includes testing a compressibility ratio of data and selecting, according to the compressibility ratio, memory regions for storing the data and replicated data.

19 Claims, 10 Drawing Sheets

DATA STORAGE SYSTEM FOR DATA DISTRIBUTION AND DATA RESTORATION BASED ON COMPRESSIBILITY RATIO OF DATA AND OPERATING METHOD OF CONTROLLER FOR CONTROLLING THE DATA DISTRIBUTION AND DATA RESTORATION

CROSS-REFERENCES TO RELATED APPLICATION

The present application claims priority under 35 U.S.C. § 119(a) to Korean application number 10-2020-0041759, filed on Apr. 6, 2020, in the Korean Intellectual Property Office, which is incorporated herein by reference in its entirety as set forth in full.

BACKGROUND

1. Technical Field

Various embodiments are related to a data storage system capable of distributing data and storing the distributed data.

2. Related Art

A data storage system may be configured to store data in response to a request from a user. A data storage system may include a plurality of subsystems coupled to each other through a network. The data storage system may distribute data to the plurality of subsystems. The plurality of subsystems may store the distributed data.

SUMMARY

Various embodiments of the present disclosure provide a data storage system capable of effectively restoring data and an operating method of a controller for effectively restoring data.

In accordance with an embodiment, a method for operating a controller configured to control subsystems in a network, each subsystem including a plurality of memory regions, may include testing a compressibility ratio of data; and selecting, according to the compressibility ratio, memory regions for storing the data and replicated data.

In accordance with an embodiment, a data storage system may include subsystems coupled to one another through a network, the subsystems comprising respective pluralities of memory regions; and a controller configured to test a compressibility ratio of data and to select, according to the compressibility ratio, memory regions for storing the data and replicated data.

In accordance with an embodiment, a data storage system may include subsystems provided in a network, each subsystem including a plurality of memory regions; and a controller configured to control, when replicating source data from a source subsystem into a destination subsystem, whether the source data is to be compressed before being transmitted through the network according to a compressibility ratio associated with the source data.

In accordance with an embodiment, the data storage system and the operating method of the controller may effectively restore data.

BRIEF DESCRIPTION OF THE DRAWINGS

Features, aspects and embodiments are described in conjunction with the attached drawings, in which.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the disclosed embodiments to those skilled in the art.

The drawings are not necessarily to scale and, in some instances, proportions may have been exaggerated in order to clearly illustrate features of the embodiments. The terminology used herein is for the purpose of describing particular embodiments only and is not intended to be limiting of the embodiments.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, exemplary embodiments of the present disclosure will be described below with reference to the accompanying drawings.

Figure 1:
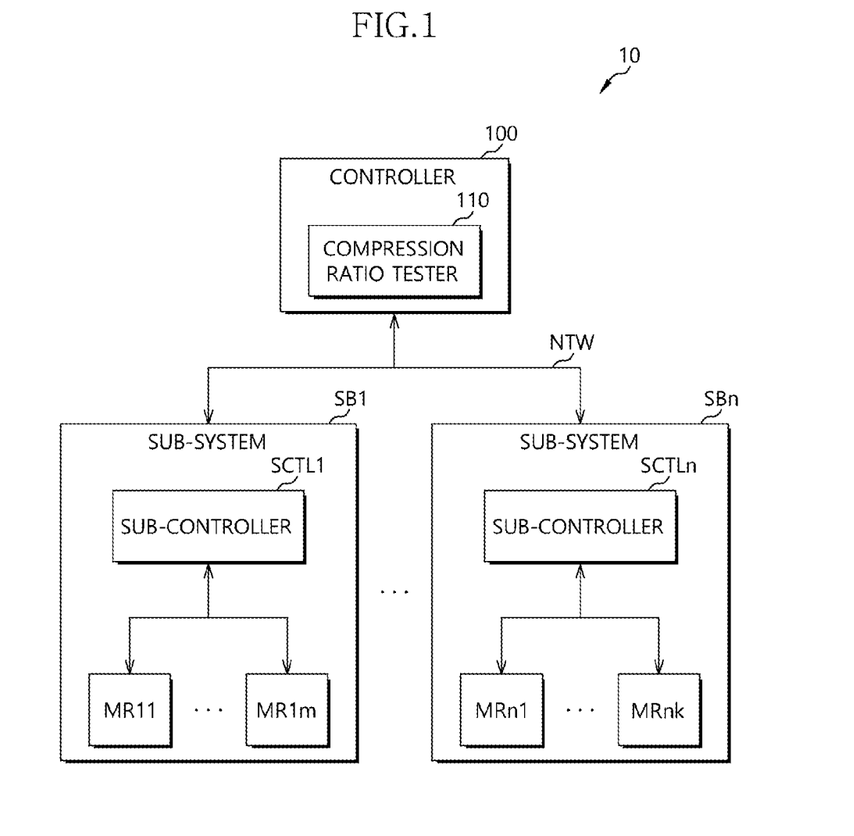
FIG. 1 shows a data storage system in accordance with an embodiment.

FIG. 1 shows a data storage system 10 in accordance with an embodiment.

Referring to FIG. 1, the data storage system 10 may include a data center, an internet data center, a cloud data center, a personal computer, a laptop computer, a smartphone, a tablet computer, a digital camera, a game console, a navigation, a virtual reality device, a wearable device, and so forth.

The data storage system 10 may include a controller 100 and subsystems SB1 to SBn coupled to each other through a network NTW.

The controller 100 may control general operations of the data storage system 10. The controller 100 may control sub-controllers SCTL1 to SCLRn of the subsystems SB1 to SBn to distribute data to the subsystems SB1 to SBn and to store the distributed data into memory regions MR11 to MR1$m$ and MRn1 to MRnk within the subsystems SB1 to SBn. For distributing and storing data into the memory regions MR11 to MR1$m$ and MRn1 to MRnk, the controller 100 may monitor performance of the subsystems SB1 to SBn and the network NTW.

For preparing to repair damage of data stored by the storage system 10, the controller 100 may store original data and replicated data into the memory regions MR11 to MR1$m$ and MRn1 to MRnk. When the original data is damaged, the controller 100 may copy the corresponding replicated data into another memory region to perform a data restoration operation. When the replicated data is damaged, the controller 100 may re-store the replicated data by utilizing the corresponding original data. That is, when either the original data or the replicated data is damaged, the controller 100 may perform a data restoration operation by utilizing the corresponding undamaged data.

The controller 100 may perform a data restoration operation by units of memory regions. That is, when, for instance, at least a part of the original data stored in a memory region is damaged, the controller 100 may perform a data restoration operation by copying all of the data in a memory region storing the corresponding original data.

Hereinafter, data in a unit of a memory region that is to be replicated in a data restoration operation will be referred to as source data, a memory region storing the source data may be referred to as the source memory region, and a subsystem including the source memory region may will be referred to as the source subsystem. Also, a memory region into which the source data is replicated will be referred to as the destination memory region and a subsystem including the destination memory region will be referred to as the destination subsystem.

The controller 100 may include a compression ratio tester 110. The compression ratio tester 110 may test a compressibility ratio of data. For example, the compression ratio tester 110 may compress a sample of original data to determine a compression ratio of the sample, thereby estimating a ratio by which the original data can be compressed, i.e., a compressibility ratio of the original data.

The controller 100 may select memory regions for storing original data and replicated data according to the compressibility ratio of the original data.

Figure 2:
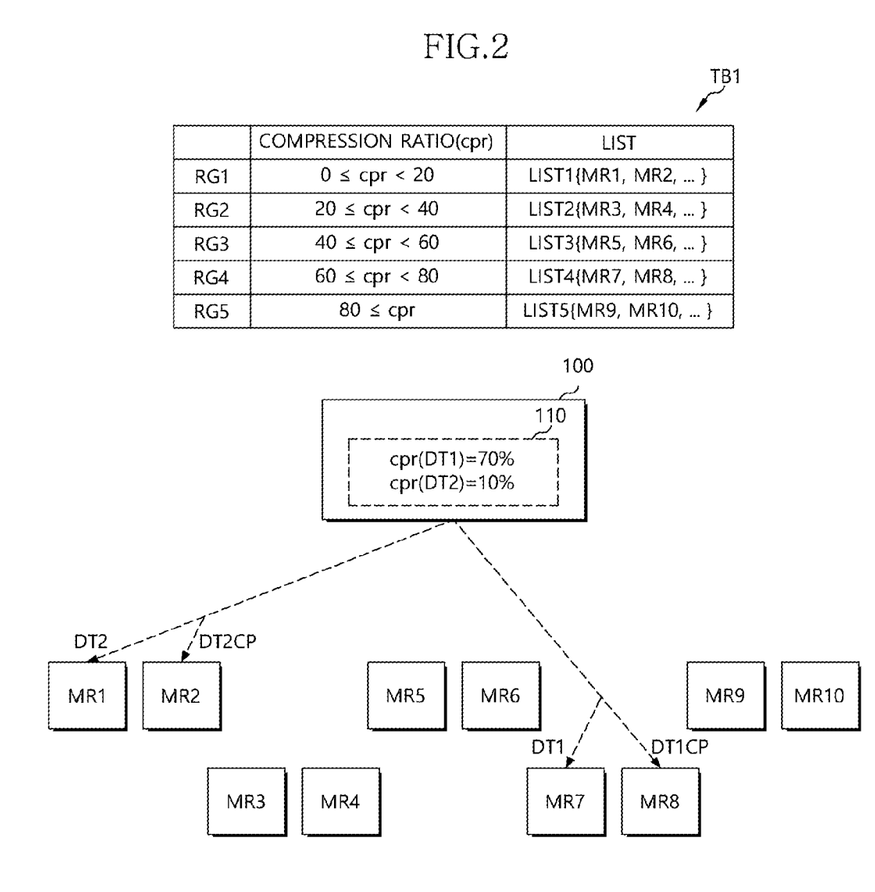
FIG. 2 shows a method that of controller of FIG. 1 determining, according to a compressibility ratio, memory regions for storing original data and replicated data in accordance with an embodiment.

FIG. 2 shows a method that the controller 100 of FIG. 1 performs to select, according to a compressibility ratio, memory regions for storing original data and replicated data in accordance with an embodiment.

Referring to FIG. 2, a table TB1 may include lists LIST1 to LIST5 of memory regions corresponding to ranges RG1 to RG5 of compressibility ratio cpr. The controller 100 may associate the lists LIST1 to LIST5 of memory regions respectively with the ranges RG1 to RG5 of compressibility ratio cpr. Each list of the lists LIST1 to LIST5 designates memory regions in which to store original and replicated data having a compressibility ratios cpr within the compression range associated with the list. The number of ranges RG1 to RG5 of compressibility ratio cpr is exemplary; there may be fewer or more.

The memory regions included in each any of the lists LIST1 to LIST5 may reside in the same subsystem or in different subsystems. Therefore, a unit of original data and a corresponding unit of replicated data may be stored in respective memory regions of the same subsystem or in respective memory regions of different subsystems.

Hereinafter, described will be a data storing method performed by the controller 100 for storing data. It is assumed that the compression ratio tester 110 determines that the compressibility ratio cpr of original data DT1 is 70%, for example, and determines that the compressibility ratio cpr of original data DT2 is 10%, for example.

Since the compressibility ratio cpr of the original data DT1 falls in the range RG4, the controller 100 may, according to the list LIST4 associated with range RG4 in the table TB1, determine to store the original data DT1 into the memory region MR7 and to store replicated data DT1CP into the memory region MR8. Both the original data DT1 and the replicated data DT1CP may be stored respectively into the memory regions MR7 and MR8 without compression thereof.

Since the compressibility ratio cpr of the original data DT2 falls in the range RG1, the controller 100 may, according to the list associated LIST1 associated with range RG1 in the table TB1, determine to store the original data DT2 into the memory region MR1 and to store replicated data DT2CP into the memory region MR2. Both the original data DT2 and the replicated data DT2CP may be stored respectively into the memory regions MR1 and MR2 without compression thereof.

That is, each of the memory regions MR1 to MR10 may store original data or replicated data of similar compressibility ratios cpr. Therefore, when performing a data restoration operation by units of memory regions, a data restoration operation may be effectively performed, as described later.

Referring back to FIG. 1, when replicating source data from a source subsystem into a destination subsystem in a data restoration operation, the controller 100 may control whether the source data is to be compressed before being transmitted through the network NTW according to the compressibility ratio cpr of the source data (the compressibility ratio may be obtained from the associated compressibility ratio range).

For example, when the compressibility ratio cpr of the source data is greater than a predetermined threshold value (i.e. a compressibility ratio threshold), the controller 100 may cause the source data to be compressed before being transmitted through the network NTW. Since the source data is not compressed before being stored in the source subsystem, the controller 100 may control the source subsystem to compress the source data and to transmit the compressed source data through the network NTW. The controller 100 may control the destination subsystem to decompress the compressed source data received through the network NTW and to store therein the decompressed data.

On the other hand, when the compressibility ratio cpr of the source data is not greater than (or perhaps equal to) the predetermined threshold value, the controller 100 may cause the source data to be transmitted through the network NTW without compression thereof. That is, the controller 100 may control the source subsystem to transmit the source data through the network NTW without compression thereof. The controller 100 may control the destination subsystem to store therein the source data received through the network NTW.

In an embodiment, when replicating the source data from the source subsystem into the destination subsystem in a data restoration operation, the controller 100 may determine a bottleneck and accordingly control whether the source data is to be compressed before being transmitted through the network NTW. Based on various references, the controller 100 may determine, from among the source subsystem, the destination subsystem and the network NTW, which is a bottleneck. For example, the controller 100 may determine that a bottleneck exists based on a resource-usage ratio. The resource-usage ratio may be a ratio of resources currently being used for other operations to resources supposed to be used for a data restoration operation. For example, the controller 100 may determine that a bottleneck exists based on a data transmission speed.

When the network NTW is determined to be a bottleneck, the controller 100 may cause the source data to be compressed before being transmitted through the network NTW. Since the source data is stored without being compressed in the source subsystem, the controller 100 may control the source subsystem to compress the source data and to transmit the compressed source data through the network NTW. The controller 100 may control the destination subsystem to decompress the compressed source data received through the network NTW and to store the decompressed data therein.

When the destination subsystem is determined to be a bottleneck, the controller 100 may cause the source data to be compressed before being transmitted through the network NTW. In this case, the controller 100 may control the source subsystem to compress the source data and to transmit the compressed source data through the network NTW. The controller 100 may control the destination subsystem to temporarily store the compressed source data received through the network NTW, and then later decompress the temporarily stored data in an idle time and to store therein the decompressed data.

When the source subsystem is determined to be a bottleneck, the controller 100 may cause the source data to be transmitted through the network NTW without compression thereof. That is, the controller 100 may control the source subsystem to transmit the source data through the network NTW without compression thereof. The controller 100 may control the destination subsystem to store therein the source data received through the network NTW.

In an embodiment, according to the compressibility ratio cpr of original data, the controller 100 may store replicated data, without compression thereof, in at least one memory region and the replicated data, with compression thereof, in at least one other memory region. When the compressibility ratio cpr of the original data is greater than a predetermined threshold value, the controller 100 may store the replicated data, without compression thereof, in at least one memory region, and store the replicated data, with compression thereof, in at least one other memory region.

The subsystems SB1 to SBn may store data into the memory regions MR11 to MR1m and MRn1 to MRnk according to the control of the controller 100. According to the control of the controller 100, the subsystems SB1 to SBn may compress source data, transmit compressed source data through the network NTW, and decompress compressed source data received through the network NTW.

The subsystems SB1 to SBn may include the sub-controllers SCTL1 to SCLRn and the memory regions MR11 to MR1m and MRn1 to MRnk, respectively. Each of the sub-controllers SCTL1 to SCLRn may store data into the memory regions MR11 to MR1m and MRn1 to MRnk according to the control of the controller 100.

A memory region may be one that is physically partitioned such as the Solid State Drive (SSD) and a flash memory apparatus. A memory region may be one that is logically partitioned such as a logical drive and a partition. As described above, a memory region may be a unit of memory for the controller 100 to perform a data restoration operation.

In an embodiment, when each of the memory regions MR11 to MR1m and MRn1 to MRnk is included in an SSD, compression of the source data may be performed within the SSD storing the source data or within a sub-controller of the source subsystem. Similarly, decompression of the compressed source data may be performed within the SSD as the destination memory regions storing the source data or within a sub-controller of the destination subsystem.

Figure 3A:
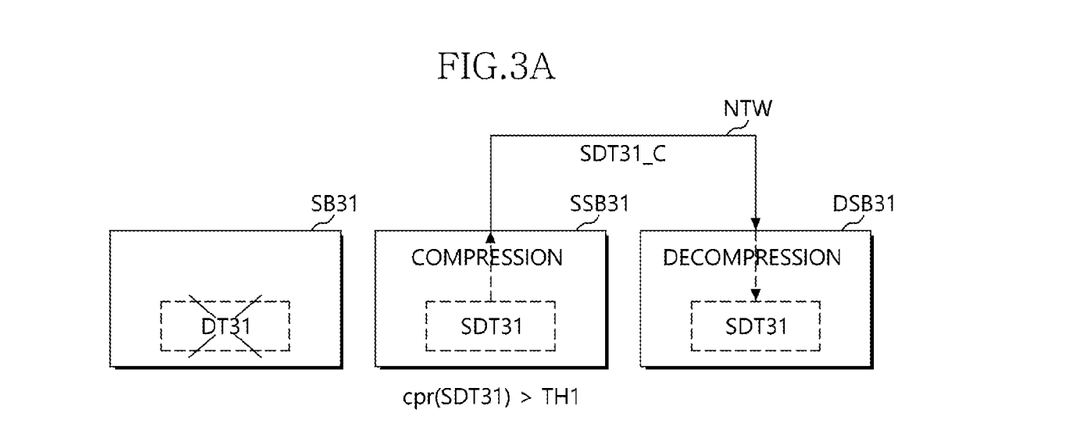
FIGS. 3A and 3B show data restoration methods of a controller in accordance with an embodiment.
Figure 3B:
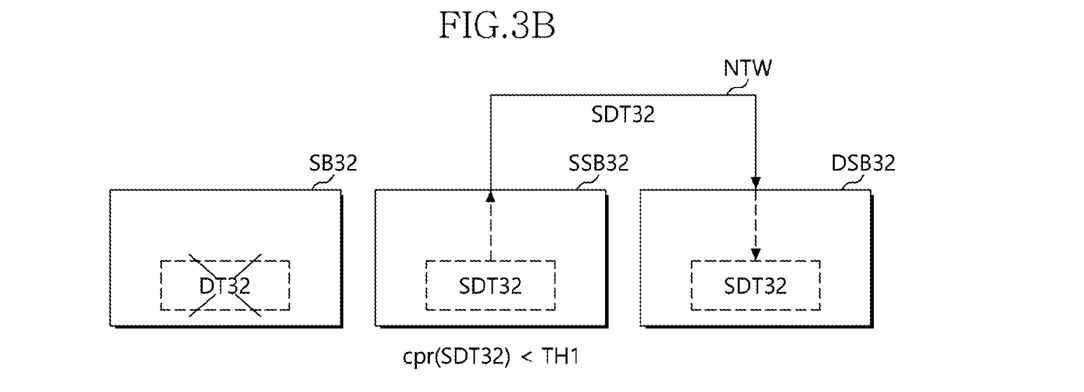

FIGS. 3A and 3B show data restoration methods of the controller 100 in accordance with an embodiment.

Referring to FIG. 3A, it is assumed that the controller 100 determines data DT31 as damaged. In order to restore the data DT31, the controller 100 may determine to replicate source data SDT31 into a destination subsystem DSB31. As described above, the damaged data DT31 may be whichever of the original data and replicated data is damaged, and the source data SDT31 may be whichever of the original data and the replicated data is undamaged.

The controller 100 may determine to store the source data SDT31, which is stored in a source subsystem SSB31, into the destination subsystem DSB31. Since the source data SDT31 is to be transmitted to the destination subsystem DSB31 through the network NTW, the controller 100 may determine whether to transmit the source data SDT31 with compression or whether to transmit the source data SDT31 without compression.

Since, per table TB1, the controller 100 knows the range of compressibility ratio corresponding to a source memory region (not illustrated), the controller 100 may compare the compressibility ratio cpr of the source data SDT31 (inferred from the associated compressibility ratio range) with a predetermined threshold value TH1. For example, when the threshold value TH1 is 60% and the source memory region is included in the list LIST4 of FIG. 2, the controller 100 may determine that the compressibility ratio cpr of the source data SDT31 (which must be at least 60% according to the range RG4 associated with list LIST4) is necessarily greater than or equal to the threshold value TH1. In this case, the controller 100 may cause the source data SDT31 to be compressed to compressed source data SDT31_C before being transmitted through the network NTW. According to the control of the controller 100, the source subsystem SSB31 may compress the source data SDT31 and may transmit the compressed source data SDT31_C through the network NTW.

According to the control of the controller 100, the destination subsystem DSB31 may decompress the compressed source data SDT31_C received through the network NTW and may store the decompressed source data SDT31 into a destination memory region (not illustrated).

In an embodiment, when determining to transmit the source data STD31 as compressed source data SDT31_C, the controller 100 may further select a compression method. A fast compression method (or a compression method utilizing less resource) may compress data with a lower compression ratio. A slow compression method (or a compression method utilizing more resource) may compress data with a higher compression ratio. Therefore, the controller 100 may select different compression methods according to the resource-usage ratios of the source subsystem SSB31 and the destination subsystem DSB31. For example, when the resource-usage ratio of either the source subsystem SSB31 or the destination subsystem DSB31 is high, the controller 100 may determine to compress the source data SDT31 through the faster compression method. In this case, the source data SDT31 may be compressed with a lower compression ratio than its minimum compressibility ratio cpr (as indicated by the associated range RG4) even though the source data SDT31 can be compressed with a higher compression ratio cpr. On the other hand, when the resource-usage ratios of both the source subsystem SSB31 and the destination subsystem DSB31 are low, the controller 100 may determine to compress the source data SDT31 with the lower compression method suited to compress the source data SDT31 to the compressibility ratio cpr.

Referring to FIG. 3B, it is assumed that the controller 100 determines data DT32 is damaged. In order to restore the data DT32, the controller 100 may determine to replicate source data SDT32, which is stored in a source subsystem SSB32, into a destination subsystem DSB32.

When the threshold value TH1 is 60% and the source memory region is included in the list LIST2 of FIG. 2, the controller 100 may determine the minimum compressibility ratio cpr of the source data SDT32 (i.e. 20% as per the associated compressibility ratio range) is not greater than the threshold value TH1. In this case, the controller 100 may cause the source data SDT32 to be transmitted through the network NTW without compression thereof. According to the control of the controller 100, the source subsystem SSB32 may transmit the source data SDT32 through the network NTW without compression thereof. According to the control of the controller 100, the destination subsystem DSB32 may store the source data SDT32 received through the network NTW into a destination memory region (not illustrated).

In an embodiment, when storing the original data and the replicated data, the controller 100 may further store a corresponding compressibility ratio. In this case, the controller 100 may determine whether to compress the source data before transmitting the source data by comparing the stored compressibility ratio with the threshold value TH1.

To sum up, the controller 100 may compress data of a high compressibility ratio and transmit the compressed data in a data restoration operation to improve a restoration speed. Since the data compression reduces occupied bandwidth of the network NTW, the controller 100 may not dedicate the limited network resource to the data restoration operation and may instead allocate the limited network resource to another service.

Also, the controller 100 may determine a restoration method according to overall resources available for the subsystems and the network NTW, as described later.

Figure 4A:
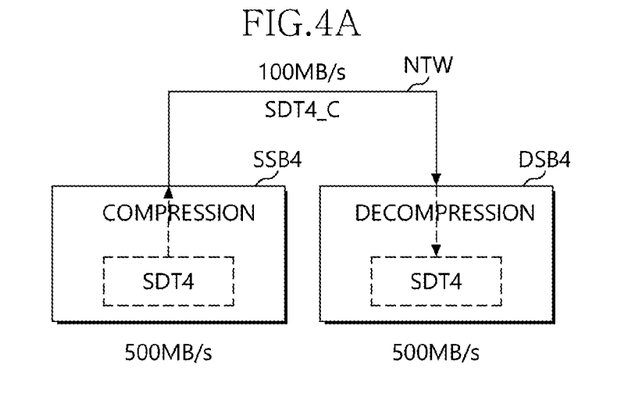
FIGS. 4A to 4C show data restoration methods of a controller in accordance with an embodiment.
Figure 4B:
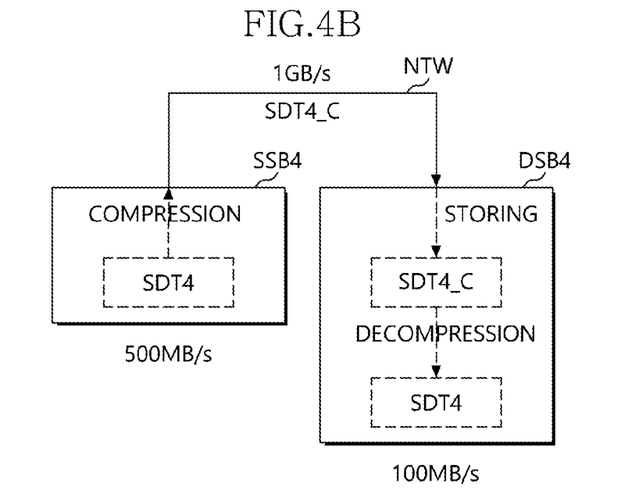
Figure 4C:
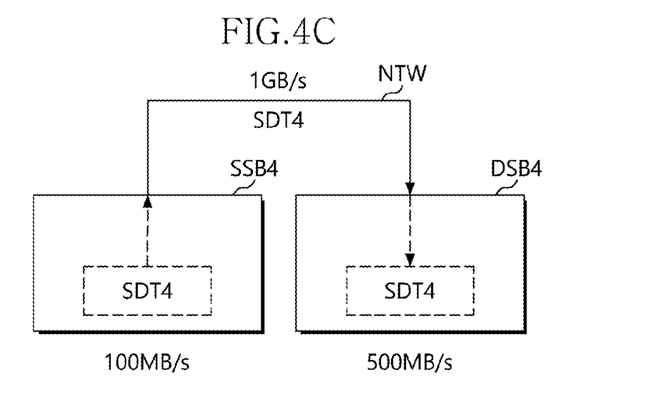

FIGS. 4A to 4C show data restoration methods of the controller 100 in accordance with an embodiment.

Referring to FIGS. 4A to 4C, when determining to replicate source data SDT4 from a source subsystem SSB4 into a destination subsystem DSB4, the controller 100 may determine a bottleneck among the network NTW, the source subsystem SSB4, and the destination subsystem DSB4, and accordingly determine whether to compress the source data SDT4 before transmitting the source data SDT4.

For example, the controller 100 may determine, as a bottleneck, one of a higher resource-usage ratio among the network NTW, the source subsystem SSB4, and the destination subsystem DSB4. For example, the controller 100 may determine, as a bottleneck, one of a lower data transmission speed among the network NTW, the source subsystem SSB4 and the destination subsystem DSB4. Also, the controller 100 may determine the bottleneck based on various other conditions.

Referring to FIG. 4A, the controller 100 may determine that the network NTW is a bottleneck when the data transmission speeds of the network NTW, the source subsystem SSB4 and the destination subsystem DSB4 are respectively 100 MB/s, 500 MB/s and 500 MB/s.

In this case, the controller 100 may cause the source data SDT4 to be compressed to compressed source data SDT4_C before being transmitted through the network NTW. According to the control of the controller 100, the source subsystem SSB4 may compress the source data SDT4 and may transmit the compressed source data SDT4_C through the network NTW. According to the control of the controller 100, the destination subsystem DSB4 may decompress the compressed source data SDT4_C received through the network NTW and may store the decompressed source data SDT4 into a destination memory region (not illustrated).

Therefore, the controller 100 may promptly perform a data restoration operation and the excessive degradation of the data storage system 10 may be prevented.

In an embodiment, as well as the determination of a bottleneck, the controller 100 may determine whether to compress the source data SDT4 before transmission thereof based further on the compressibility ratio cpr of the source data SDT4 (as per the associated compressibility ratio range). For example, when the network NTW is determined to be a bottleneck, the controller 100 may cause the source data SDT4 of a higher compressibility ratio cpr than a predetermined threshold value to be compressed before being transmitted. That is, even when the network NTW is determined to be a bottleneck, the controller 100 may control the source data SDT4 of a lower compressibility ratio cpr than the predetermined threshold value to be transmitted without compression thereof.

Referring to FIG. 4B, the controller 100 may determine the destination subsystem DSB4 to be a bottleneck when the data transmission speeds of the network NTW, the source subsystem SSB4 and the destination subsystem DSB4 are respectively 1 GB/s, 200 MB/s and 100 MB/s.

In this case, the controller 100 may cause the source data SDT4 to be compressed source to compressed source data SDT4_C before being transmitted through the network NTW. According to the control of the controller 100, the source subsystem SSB4 may compress the source data SDT4 and may transmit the compressed source data SDT4_C through the network NTW. According to the control of the controller 100, the destination subsystem DSB4 may temporarily store the compressed source data SDT4_C received through the network NTW into a temporary memory region (not illustrated), may decompress the compressed source data SDT4_C temporarily stored in the temporary memory region during an idle time, and may store the decompressed source data SDT4 into a destination memory region (not illustrated).

That is, when the destination subsystem DSB4 is the bottleneck, the controller 100 may postpone the decompression of the compressed source data SDT4_C to prevent the excessive degradation of the data storage system 10.

In an embodiment, as well as the determination of a bottleneck, the controller 100 may determine whether to compress the source data SDT4 before transmission thereof based further on the compressibility ratio cpr of the source data SDT4 (as per the associated compressibility ratio range). For example, when the destination subsystem DSB4 is determined to be a bottleneck, the controller 100 may control the source data SDT4 determined to have a higher compressibility ratio cpr than a predetermined threshold value to be compressed before being transmitted. That is, even when the destination subsystem DSB4 is determined to be a bottleneck, the controller 100 may control the source data SDT4 of a lower compressibility ratio cpr than the predetermined threshold value to be transmitted without compression thereof.

Referring to FIG. 4C, the controller 100 may determine that the source subsystem SSB4 is a bottleneck when the data transmission speeds of the network NTW, the source subsystem SSB4 and the destination subsystem DSB4 are respectively 1 GB/s, 100 MB/s and 500 MB/s, for example.

In this case, the controller 100 may cause the source data SDT4 to be transmitted through the network NTW without compression thereof. According to the control of the controller 100, the source subsystem SSB4 may transmit the source data SDT4 through the network NTW without compressing the source data SDT4. According to the control of the controller 100, the destination subsystem DSB4 may store the source data SDT4 received through the network NTW into a destination memory region (not illustrated).

In an embodiment, the controller 100 may operate in a similar way to the embodiment of FIG. 4C when the data transmission speeds of the source subsystem SSB4 and the destination subsystem DSB4 are similar to each other, although the data transmission speeds of the source subsystem SSB4 and the destination subsystem DSB4 are lower than the data transmission speed of the network NTW.

Figure 5:
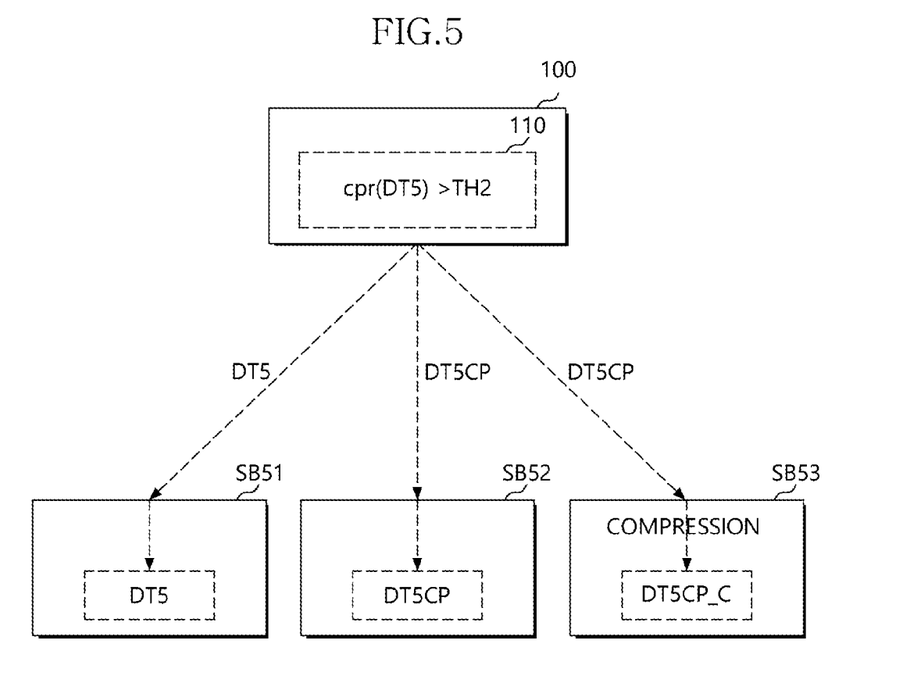
FIG. 5 shows a method of a controller storing replicated data in accordance with an embodiment.

FIG. 5 shows a method by which the controller 100 stores replicated data in accordance with an embodiment.

Referring to FIG. 5, the controller 100 may store two or more pieces of replicated data DT5CP of original data DT5. The controller 100 may store the two or more pieces of replicated data DT5CP of the original data DT5 having a compressibility ratio cpr determined through the compression-ratio tester 110 to be greater than a predetermined threshold value TH2.

In this case, the controller 100 may determine to simultaneously store at least one piece of the replicated data DTSCP in an uncompressed state in a subsystem SB52 and at least one piece of the replicated data DTSCP in a compressed state in a subsystem SB53. According to the control of the controller 100, the subsystem SB52 may store the replicated data DTSCP in a memory region (not illustrated) while uncompressed. According to the control of the controller 100, the subsystem SB53 may compress the replicated data DT5CP and may store compressed and replicated data DT5CP_C in a memory region (not illustrated).

Therefore, the uncompressed and replicated data DT5CP may guarantee a higher access speed and the compressed and replicated data DT5CP_C may cause higher space efficiency.

The original data DT5 and the replicated data DT5CP may be stored in the same subsystem, which is different from what is shown in FIG. 5.

In an embodiment, when determining the compressed and replicated data DT5CP_C to be transmitted in a data restoration operation for the original data DT5, the controller 100 may control the compressed and replicated data DT5CP_C, which is stored in the subsystem SB53, to be transmitted to a destination subsystem. In this case, the compression of the replicated data DT5CP may be omitted in the data restoration operation. On the other hand, when determining the uncompressed replicated data DTSCP to be transmitted in the data restoration operation for the original data DT5, the controller 100 may control whether the replicated data DTSCP, which is stored in the subsystem SB52, is to be compressed before being transmitted to a destination subsystem.

Figure 6:
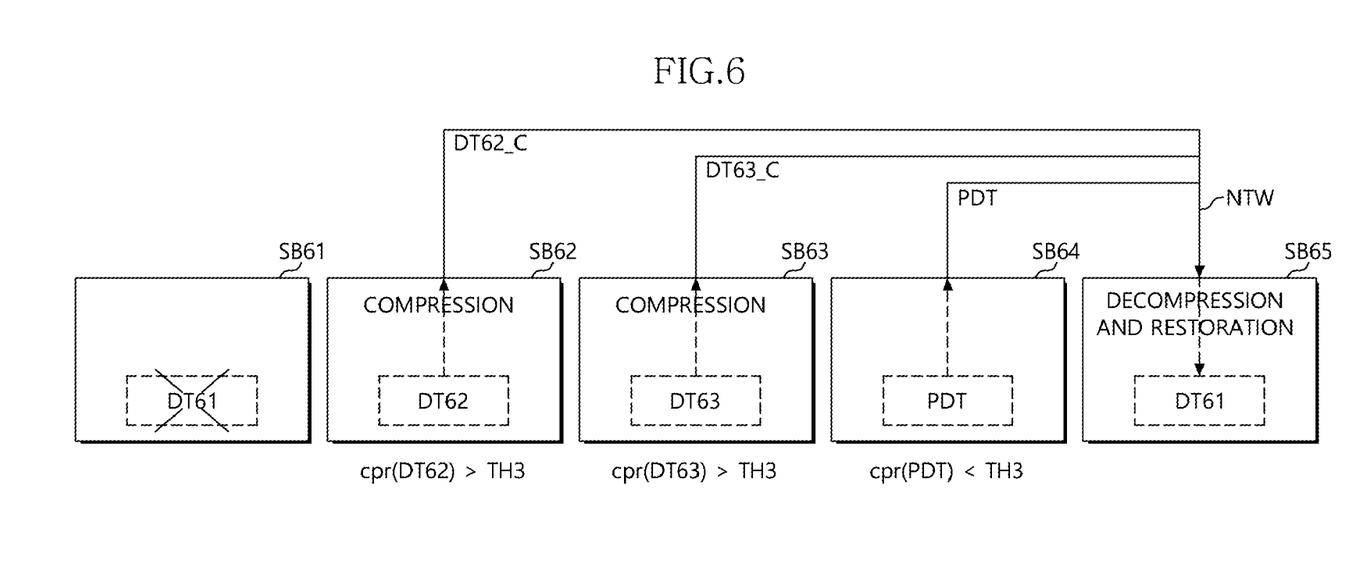
FIG. 6 shows a method of a controller performing a data restoration operation based on Erasure encoding in accordance with an embodiment.

FIG. 6 shows a method of the controller 100 performing a data restoration operation based on Erasure coding in accordance with an embodiment.

Referring to FIG. 6, based on the Erasure coding, the controller 100 may store data DT61 to DT63 into subsystems SB61 to SB63 and may store parity data PDT into a subsystem SB64. When storing the data DT61 to DT63 and the parity data PDT into the subsystems SB61 to SB64, the controller 100 may test the compressibility ratio of each of the data DT61 to DT63 and the parity data PDT to store the data DT61 to DT63 and the parity data PDT. That is, the controller 100 may determine the compressibility ratio of each of the data DT61 to DT63 and the parity data PDT and then may store the data DT61 to DT63 and the parity data PDT, which are uncompressed, into memory regions. Although FIG. 6 illustrates the case of storing one piece of the parity data PDT, plural pieces of the parity data PDT may be stored depending on which coding scheme is used. Although FIG. 6 illustrates the case of storing the data DT61 to DT63 and the parity data PDT into different subsystems, the data DT61 to DT63 and the parity data PDT may be stored in the same subsystem, depending on an embodiment.

For example, when the data DT61 is damaged, the controller 100 may determine to restore the damaged data DT61 by utilizing the remaining data DT62 and DT63 and the parity data PDT. In this case, when the damaged data DT61 is to be restored in a separate subsystem SB65 and thus the remaining data DT62 and DT63 and the parity data PDT are to be transmitted to the separate subsystem SB65 through the network NTW, the controller 100 may determine whether to transmit the remaining data DT62 and DT63 and the parity data PDT, which are compressed, according to the compressibility ratios cpr of the remaining data DT62 and DT63 and the parity data PDT.

By comparing a predetermined threshold value TH3 with each compressibility ratio cpr of the remaining data DT62 and DT63 and the parity data PDT, the controller 100 may control the remaining data DT62 and DT63, each compressibility ratio cpr of which is greater than the predetermined threshold value TH3, to be transmitted with compression, and may control the parity data PDT, the compressibility ratio cpr of which is determined to be not greater than the predetermined threshold value TH3, to be transmitted without compression.

Therefore, the subsystems SB62 and SB63 may compress the remaining data DT62 and DT63 and transmit the remaining data DT62_C and DT63_C, which are compressed, through the network NTW, respectively. The subsystem SB64 may transmit the uncompressed parity data PDT through the network NTW. The separate subsystem SB65 may receive the compressed data DT62_C and DT63_C and the parity data PDT transmitted through the network NTW, may decompress the compressed data DT62_C and DT63_C into the remaining data DT62 and DT63 and may restore the damaged data DT61 by utilizing the decompressed data DT62 and DT63 and the parity data PDT.

In an embodiment, the controller 100 may determine the threshold value TH3 based on resource-usage ratios of the network NTW and the subsystems SB62 to SB65, respectively. For example, since compressed data may cause decrease of the resource-usage ratio of the network NTW to transfer the data and increase the resource-usage ratios of the subsystems SB62 to SB65 to compress and decompress the data, the controller 100 may determine the threshold value TH3 based on which, among the network NTW and the subsystems SB62 to SB65, is a resource determined to be more utilized.

Figure 7:
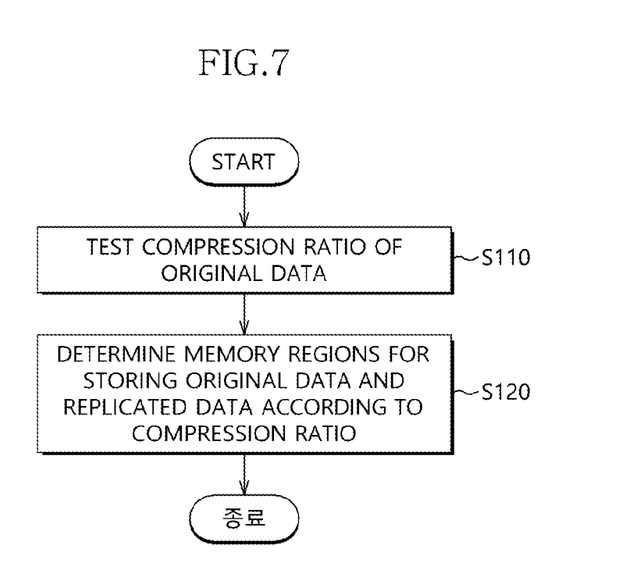
FIG. 7 shows a data storing method performed by a controller in accordance with an embodiment.

FIG. 7 shows a data storing method of the controller 100 in accordance with an embodiment.

Referring to FIG. 7, in step S110, the compression-ratio tester 110 of the controller 100 may test the compressibility ratio of original data.

In step S120, the controller 100 may determine memory regions for storing the original data and replicated data according to the compressibility ratio of the original data. The controller 100 may match the memory regions respectively to the ranges of compressibility ratio, as per the compressibility ratio ranges and memory region lists in table TB1. The controller 100 may determine, among the ranges of compressibility ratio, a range in which the compressibility ratio of the original data falls. The controller 100 may determine to store the original data and the replicated data respectively into memory regions corresponding to the determined range and associated list. Therefore, according to the control of the controller 100, the original data and the replicated data may be stored respectively into the determined memory regions without compression thereof.

Figure 8:
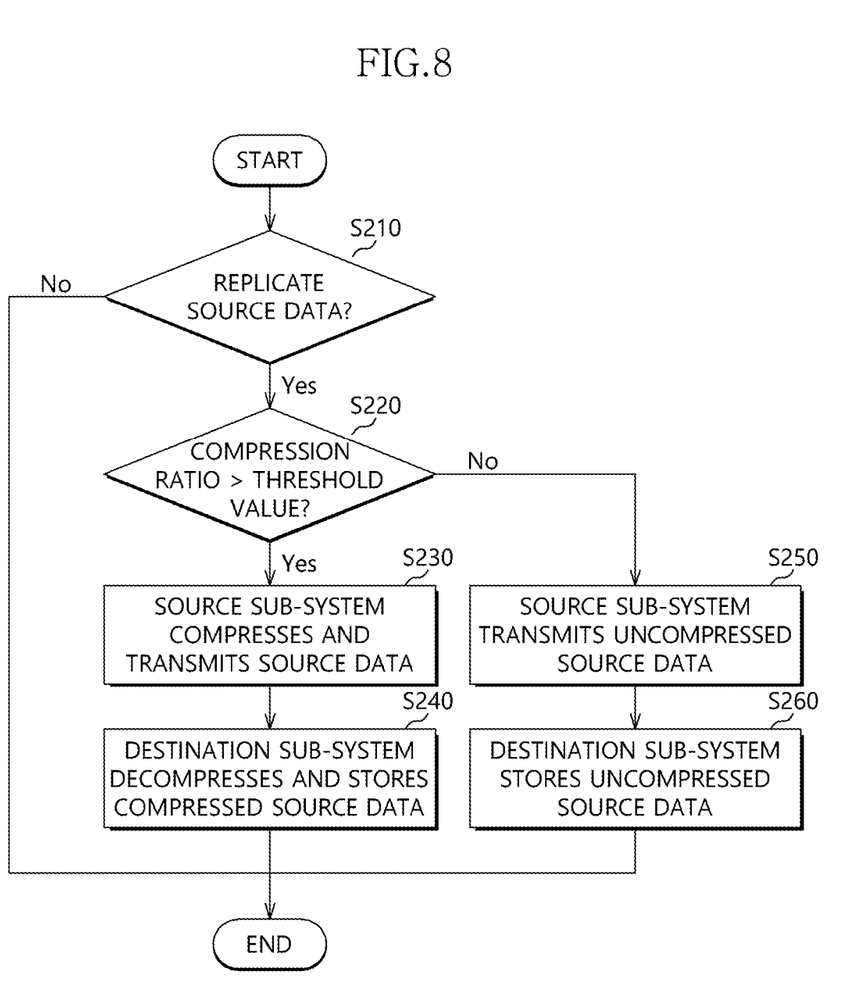
FIG. 8 shows a data restoration operation method performed by a controller in accordance with an embodiment.

FIG. 8 shows a data restoration operation method of the controller 100 in accordance with an embodiment.

Referring to FIG. 8, in step S210, the controller 100 may determine whether to perform a data restoration operation of replicating the source data from the source subsystem into the destination subsystem. When the data restoration operation is determined not to be performed, the process may end. When the data restoration operation is determined to be performed, the process may go to step S220.

In step S220, the controller 100 may determine whether the compressibility ratio of the source data (as per the associated compressibility ratio range) is greater than a predetermined threshold value. When the compressibility ratio (or range) of the source data is determined to be greater than the predetermined threshold value, the process may go to step S230. When the compressibility ratio (or range) of the source data is determined to be not greater than the predetermined threshold value, the process may go to step S250.

In step S230, the controller 100 may cause the source subsystem to compress the source data before being transmitted through the network NTW.

In step S240, the controller 100 may cause the destination subsystem to decompress the compressed source data received through the network NTW and to store therein the decompressed source data.

In step S250, the controller 100 may cause the source subsystem to transmit the source data through the network NTW without compression thereof.

In step S260, the controller 100 may control the destination subsystem to store therein the source data received through the network NTW without compression thereof.

Figure 9:
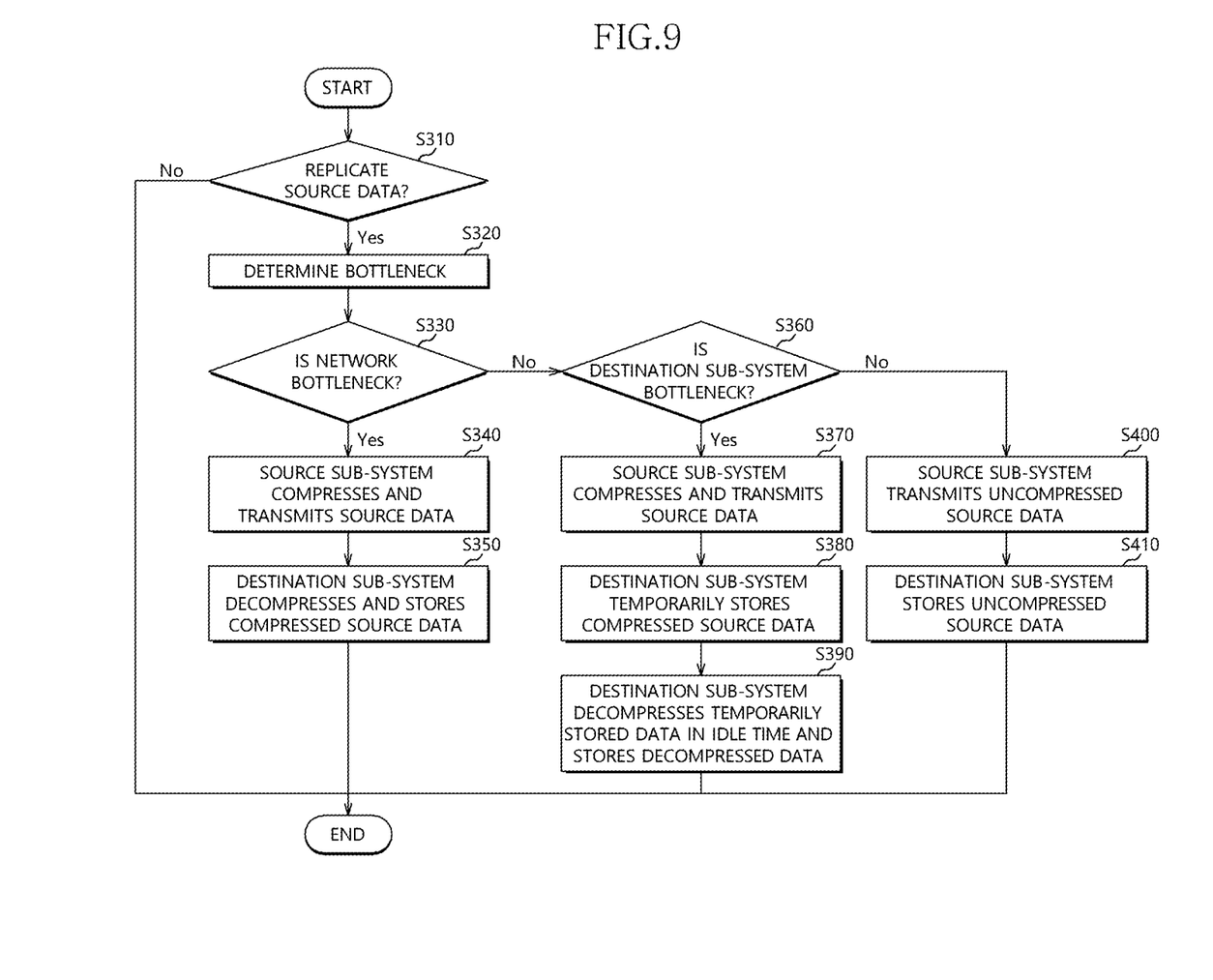
FIG. 9 shows a data restoration operation method performed by a controller in accordance with an embodiment.

FIG. 9 shows a data restoration operation method performed by the controller 100 in accordance with an embodiment.

Referring to FIG. 9, in step S310, the controller 100 may determine whether to perform a data restoration operation of replicating the source data from the source subsystem into the destination subsystem. When the data restoration operation is determined not to be performed, the process may end.

When the data restoration operation is determined to be performed, the process may go to step S320.

In step S320, the controller 100 may determine, among the network NTW, the source subsystem and the destination subsystem, which is a bottleneck. For example, the controller 100 may determine which is a bottleneck based on resource-usage ratios. For example, the controller 100 may determine the bottleneck based on the data transmission speed.

In step S330, the controller 100 may determine whether the network NTW is a bottleneck. When the network NTW is determined to be a bottleneck, the process may go to step S340. When the network NTW is determined to not be a bottleneck, the process may go to step S360.

In step S340, the controller 100 may control the source subsystem to compress the source data and to transmit the compressed source data through the network NTW.

In step S350, the controller 100 may control the destination subsystem to decompress the compressed source data transmitted through the network NTW and to store therein the decompressed source data.

In step S360, the controller 100 may determine whether the destination subsystem is a bottleneck. When the destination subsystem is determined to be a bottleneck, the process may go to step S370. When the destination subsystem is determined to not be a bottleneck, the process may go to step S400.

In step S370, the controller 100 may control the source subsystem to compress the source data and to transmit the compressed source data through the network NTW.

In step S380, the controller 100 may control the destination subsystem to temporarily store the compressed source data transmitted through the network NTW.

In step S390, the controller 100 may control the destination subsystem to decompress the temporarily stored data during an idle time thereof and to store therein the decompressed data.

In step S400, the controller 100 may control the source subsystem to transmit the uncompressed source data through the network NTW.

In step S410, the controller 100 may control the destination subsystem to store therein the source data received through the network NTW without compression thereof.

Figure 10:
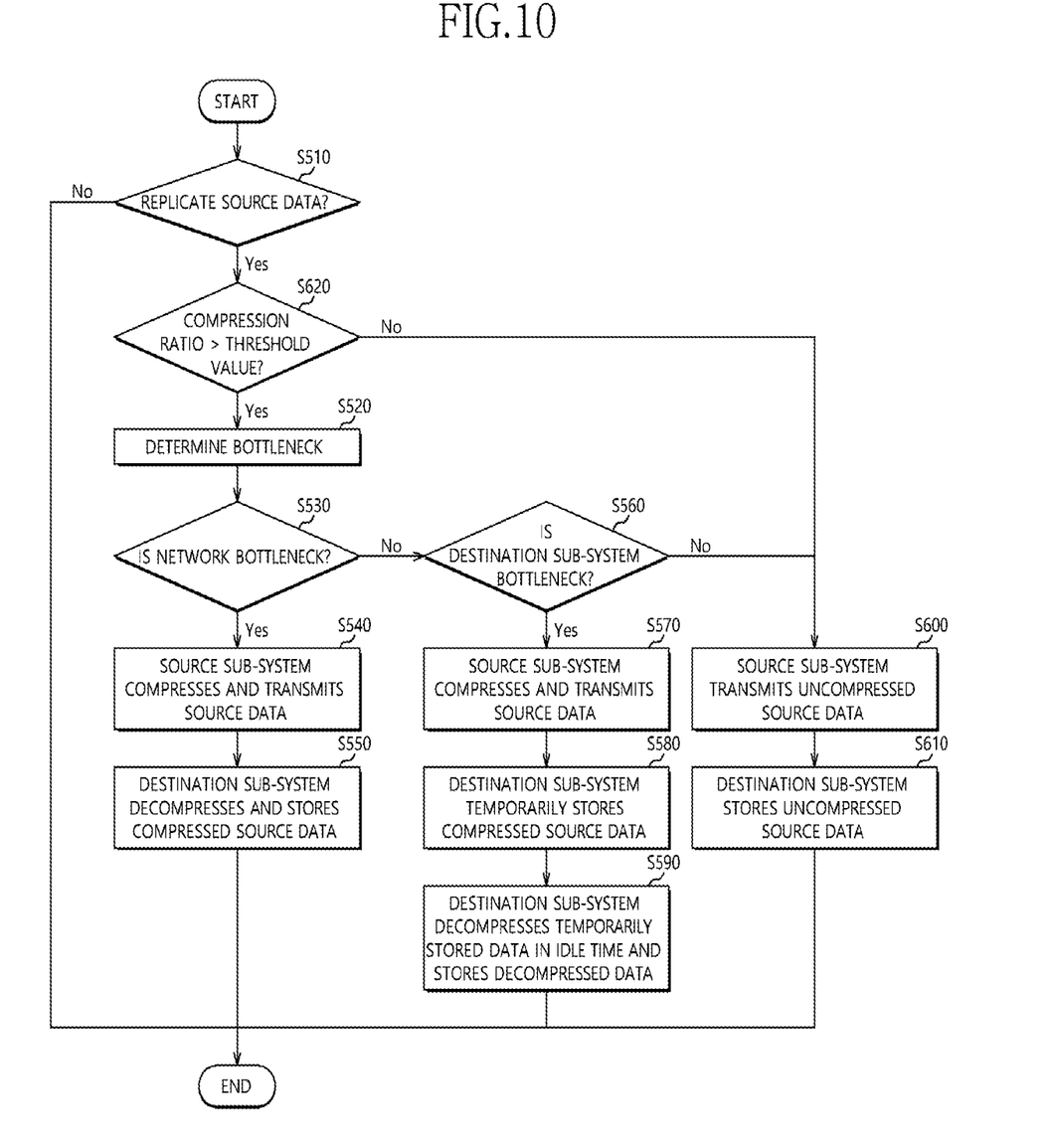
FIG. 10 shows a data restoration operation method performed by a controller in accordance with an embodiment.

FIG. 10 shows a data restoration operation method performed by the controller 100 in accordance with an embodiment. Steps S510 to S610 of FIG. 10 may be performed in the substantially same way as steps S310 to S410 of FIG. 9. Therefore, described hereinafter will be some steps that may differ from FIG. 9; same steps of FIG. 9 are omitted.

Referring to FIG. 10, when the data restoration operation is determined to be performed is step S510, the process may go to step S620.

In step S620, the controller 100 may determine whether the compressibility ratio of the source data is greater than a predetermined threshold value. When the compressibility ratio (as per the associated compressibility ratio range) of the source data is determined to be greater than (or perhaps equal to) the predetermined threshold value, the process may go to step S520. When the compressibility ratio of the source data is determined to be not greater than the predetermined threshold value, the process may go to step S600.

While certain embodiments have been described above, it will be understood to those skilled in the art that the embodiments described are by way of example only. Accordingly, the data storage system and operating method of controller should not be limited based on the described embodiments. Rather, the data storage system and operating method of controller described herein should only be limited in light of the claims that follow when taken in conjunction with the above description and accompanying drawings.

What is claimed is:

1. A method for operating a controller configured to control subsystems in a network, each subsystem including a plurality of memory regions, the method comprising:
   estimating a compressibility ratio of data;
   selecting, according to the compressibility ratio, memory regions for storing the data and replicated data of the data;
   storing the data and the replicated data respectively into the selected memory regions; and
   performing a data restoration operation to repair damaged data that is one of the data and the replicated data,
   wherein performing the data restoration operation comprises:
   for source data comprising undamaged data that is the other one of the data and the replicated data, when replicating the source data from a source subsystem into a destination subsystem, controlling whether the source data is to be compressed before being transmitted to the destination subsystem through the network according to a compressibility ratio of the source data.

2. The method of claim 1, further comprising:
   associating the memory regions of the subsystems with compressibility ratio ranges, respectively; and
   determining, among the compressibility ratio ranges, a compressibility ratio range into which the compressibility ratio of the data falls to select the memory regions for storing the data and the replicated data;
   wherein the data and the replicated data are respectively stored into the selected memory regions based on the determined compressibility ratio range.

3. The method of claim 1, wherein the controlling includes:
   when the compressibility ratio range associated with the source data is greater than a compressibility ratio threshold, causing the source subsystem to compress the source data and to transmit the compressed source data through the network; and
   controlling the destination subsystem to decompress the compressed source data received through the network and to store therein the decompressed source data.

4. The method of claim 1, wherein the controlling includes:
   when the compressibility ratio of the source data is not greater than a compressibility ratio threshold, causing the source subsystem to transmit the source data through the network without compressing the source data; and
   controlling the destination subsystem to store therein the source data received through the network.

5. The method of claim 1, wherein the selecting of the memory regions for storing the data and the replicated data includes determining, according to the compressibility ratio, to store the replicated data without compression thereof in at least one memory region and to store the replicated data in at least one other memory region with compression thereof.

6. A method for operating a controller configured to control subsystems in a network, each subsystem including a plurality of memory regions, the method comprising:
   estimating a compressibility ratio of data;
   selecting, according to the compressibility ratio, memory regions for storing the data and replicated data of the data;
   storing the data and the replicated data respectively into the selected memory regions; and
   performing a data restoration operation to repair damaged data that is one of the data and the replicated data,
   wherein performing the data restoration operation comprises:
   determining a bottleneck existing in one of the network, a source subsystem, and a destination subsystem when replicating source data from the source subsystem into the destination subsystem through the network, the source data comprising undamaged data that is the other one of the data and the replicated data; and
   determining, according to the bottleneck, whether the source data is to be compressed before being transmitted through the network from the source subsystem to the destination subsystem.

7. The method of claim 6, further comprising:
   controlling, when the bottleneck exists in the network, the source subsystem to compress the source data before transmitting the source data through the network; and
   controlling the destination subsystem to decompress the compressed source data received through the network and to store therein the decompressed source data.

8. The method of claim 6, further comprising:
   controlling, when the bottleneck exists in the destination subsystem, the source subsystem to compress the source data before transmitting the source data through the network; and
   controlling the destination subsystem to temporarily store the compressed source data received through the network, to decompress the temporarily stored source data during an idle time, and to store therein the decompressed source data.

9. The method of claim 6, further comprising:
   controlling, when the bottleneck exists in the source subsystem, the source subsystem to transmit the source data through the network without compression thereof; and
   controlling the destination subsystem to store therein the source data received through the network.

10. The method of claim 6, further comprising:
    determining whether a compressibility ratio of the source data and is greater than a compressibility ratio threshold before the determining of the bottleneck,
    wherein determining the bottleneck is performed when the compressibility ratio of the source data is determined to be greater than the compressibility ratio threshold.

11. The method of claim 6, wherein the bottleneck is determined based on resource-usage ratios of the network, the source subsystem, and the destination subsystem, a resource-usage ratio being a ratio of resources currently being used for other operations to resources supposed to be used for the data restoration operation.

12. A data storage system, comprising:
    subsystems coupled to one another through a network, each subsystem including a plurality of memory regions; and
    a controller configured to estimate a compressibility ratio of data, select, according to the compressibility ratio, memory regions for storing the data and replicated data of the data, store the data and the replicated data respectively into the selected memory regions, and perform a data restoration operation to repair damaged data that is one of the data and the replicated data,
    wherein, in the data restoration operation, the controller controls, when replicating source data from a source subsystem into a destination subsystem, whether the source data is to be compressed before being transmitted to the destination subsystem through the network according to a compressibility ratio of the source data, the source data being undamaged data that is the other one of the data and the replicated data.

13. The data storage system of claim 12, wherein the controller is configured to:
   associate lists of memory regions in the memory regions of the subsystems with compressibility ratio ranges, respectively, and
   determine, among the compressibility ratio ranges, a compressibility ratio range into which the compressibility ratio of the data falls,
   wherein the data and the replicated data are respectively stored into the memory regions, which are selected from the memory regions included in a list associated with the determined compressibility ratio range.

14. The data storage system of claim 12, wherein the controller is configured to, before the source data is stored in the source subsystem:
   perform compression of the source data to determine the compressibility ratio of the source data; and
   select, according to the compressibility ratio of the source data, a memory region for storing the source data from among the memory regions of the subsystems.

15. The data storage system of claim 14, wherein the controller is configured to select the memory region being associated with a predetermined compression ratio range that contains the compressibility ratio of the data.

16. The data storage system of claim 12, wherein the controller is configured to:
   cause the source data to be compressed before being transmitted through the network when the compressibility ratio of the source data is greater than a compressibility ratio threshold, and
   cause the source data to be transmitted through the network without compression thereof when the compressibility ratio of the source data is not greater than the compressibility ratio threshold.

17. The data storage system of claim 12,
   wherein the source subsystem is configured to compress the source data and to transmit the compressed source data through the network according to a control of the controller, and
   wherein the destination subsystem is configured to decompress the compressed source data received through the network and to store therein the decompressed source data according to the control of the controller.

18. The data storage system of claim 12, wherein the controller is further configured to:
   determine a bottleneck existing in one of the source subsystem, the destination subsystem, and the network,
   wherein the controller controls, according to at least one of the compressibility ratio of the source data or the bottleneck, whether the source data is to be compressed before being transmitted through the network.

19. The data storage system of claim 18, wherein the bottleneck is determined based on resource-usage ratios of the network, the source subsystem, and the destination subsystem, a resource-usage ratio being a ratio of resources currently being used for other operations to resources supposed to be used for the data restoration operation.

\* \* \* \* \*